United States Patent [19]

Bauer et al.

[11] Patent Number: 5,002,811
[45] Date of Patent: Mar. 26, 1991

[54] MULTIPLE LAYER PACKAGING SHEET MATERIAL

[75] Inventors: Frank T. Bauer, Appleton; Yong J. Kim; Roger P. Genske, both of Neenah, all of Wis.

[73] Assignee: American National Can Company, Chicago, Ill.

[21] Appl. No.: 464,279

[22] Filed: Jan. 12, 1990

Related U.S. Application Data

[60] Division of Ser. No. 138,222, Dec. 23, 1987, Pat. No. 4,894,266, which is a continuation-in-part of Ser. No. 81,789, Aug. 5, 1987, abandoned, and a continuation-in-part of Ser. No. 802,910, Nov. 29, 1985, Pat. No. 4,764,404, and a continuation-in-part of Ser. No. 45,003, Apr. 30, 1987.

[51] Int. Cl.$^5$ .............................. D29D 27/00
[52] U.S. Cl. ............................ 428/35.4; 428/483; 428/522
[58] Field of Search .................... 428/483, 522, 35.4

[56] References Cited

U.S. PATENT DOCUMENTS

| | | | |
|---|---|---|---|
| 2,762,720 | 6/1956 | Michel et al. | 117/65 |
| 2,993,876 | 7/1961 | McGlamery | 260/45.5 |
| 3,192,288 | 11/1965 | Sayko et al. | 260/897 |
| 3,358,053 | 2/1967 | Hostetler | 260/876 |
| 3,455,720 | 7/1969 | Davies et al. | 117/7 |
| 3,597,237 | 8/1971 | Nughes | 99/171 |
| 3,600,208 | 8/1971 | Abbott et al. | 117/7 |
| 3,962,018 | 6/1976 | Costemalle et al. | 156/306 |
| 4,112,181 | 9/1978 | Baird et al. | 428/336 |
| 4,294,889 | 10/1981 | Hashimoto | 428/515 |
| 4,311,742 | 1/1982 | Otsuka | 428/35 |
| 4,424,253 | 1,1984 | Anderson | 428/215 |
| 4,438,850 | 3/1984 | Kahn | 206/634 |
| 4,448,792 | 5/1984 | Schirmer | 426/113 |
| 4,472,227 | 9/1984 | Toyoda | 156/244.11 |
| 4,487,871 | 12/1984 | Ishibashi et al. | 524/100 |
| 4,505,951 | 3/1985 | Kennedy | 427/55 |
| 4,515,836 | 5/1985 | Cobbs et al. | 427/425 |
| 4,528,220 | 7/1985 | Hwo | 428/35 |
| 4,578,316 | 3/1986 | Clauson et al. | 428/516 |
| 4,626,456 | 2/1986 | Farrell | 428/35 |
| 4,654,240 | 3/1987 | Johnston | 428/35 |
| 4,689,099 | 8/1987 | Ito et al. | 156/69 |
| 4,734,459 | 8/1988 | Cecchin et al. | 525/247 |
| 4,769,261 | 9/1988 | Hazelton et al. | 428/35 |

FOREIGN PATENT DOCUMENTS 58-157839 9/1983 Japan .

OTHER PUBLICATIONS

Converting Magazine, Oct. 1987, pp. 40–42 and 44, "All Plastic Pouch: Retortable & Microwaveable".
Food Processing Magazine, Jul. 1986, p. 105.
Plastics World Magazine, Feb. 1987, p. 51.
Nippon Chemtec Consulting Report, received Apr. 1986.

Primary Examiner—Edith Buffalow
Attorney, Agent, or Firm—Robert Stenzel; Paul Audet

[57] ABSTRACT

A multiple layer sheet material comprising a first layer 12 of vinylidene chloride copolymer having a first softening temperature. A second polymeric sealant layer 14 has a second softening temperature no more than about 50° C. less than the first softening temperature. An optional third layer 16 between the first and second layers has a third softening temperature greater than either of the first and second softening temperatures and comprises a polyethylene terephthalate composition. A fourth polymeric layer 18 has a fourth softening temperature greater than the first and second softening temperatures. The first layer is positioned between the third and fourth layers. A fifth impact layer 20 is positioned between layers 14 and 16. The composition of the impact layer 20 comprises, as a first component, a base polymer drawn from the same family of polymers as a major polymeric component of the second sealant layer, and, as a second component, a polymeric composition providing elastomeric properties to the impact layer and increased shock tolerance to the multiple layer sheet material. The disclosure also teaches the use of the sheet materials in fabrication of packages and teaches methods of fabricating both the sheet materials and the packages.

7 Claims 1 Drawing Sheet

MULTIPLE LAYER PACKAGING SHEET MATERIAL

This is a division of application Ser. No. 07/138,222, filed Dec. 23,1987, U.S. Pat. No. 4,894,266, which application is a continuation-in-part of application Ser. No. 081,789 filed Aug. 5, 1987; application Ser. No. 802,910 filed Nov. 29, 1985; and application Ser. No. 045,003 filed Apr. 30, 1987; all three of which are herein incorporated by reference.

BACKGROUND OF THE INVENTION

This invention relates to multiple layer sheet materials, and especially multiple layer packaging sheet materials which are used to fabricate packages through the formation of heat seals about the periphery of the package. The invention is particularly related to those films which use a layer of vinylidene chloride copolymer as an interior layer in the sheet materials in combination with a layer of a polymeric composition which typically has a softening temperature similar to, or higher than, that of the vinylidene chloride copolymer in an exterior layer of the film. The exterior layer is adapted for use in the formation of heat seals.

In forming heat seals in such sheet materials, the amount of heat which is driven through the sheet material to the sealent layer to soften that layer sufficiently for formation of the heat seals, is also, as a secondary and undesirable function, sufficiently intense to at least somewhat soften the vinylidene chloride copolymer layer during the formation of the heat seals.

Packages made with conventional ones of such sheet materials, to the extent the overall thickness of the sheet material is less than about 0.38 mm., tend to be deficient in impact tolerance; especially packages where such sheet materials are used as closure lids on formed trays. In such applications, the lid is the weakest member of the package, such that any failure of the package typically occurs in the lid sheet material adjacent the heat seal.

"Softening temperature" as used herein is any determinant and measurable temperature which identifies a condition at which the polymer experiences a change which tends to make it more fluid, and subject to flowing at normal conditions used in forming heat seals. While the DSC melting point is generally referred to herein, other tests could equally well be used so long as they are applied equally to all the layers being compared.

It is an object of this invention to provide improved multiple layer sheet material having an interior layer of a vinylidene chloride copolymer in combination with a sealant layer, and wherein there is provided an impact layer having elastomeric properties and improved tolerance in the resulting sheet material, such that the impact tolerance of the package is improved.

It is especially an object to provide increased impact tolerance at the heat seal locus, while maintaining the ability, in the sheet materials, to form heat seals sufficiently strong to maintain the integrity of the seal throughout the intended use life of the package until it is intentionally opened.

It is yet another object of the invention to provide such films without significantly increasing the amount, or the cost, of the materials used, or the overall thickness of the films.

SUMMARY OF THE INVENTION

These and other objects of the invention are attained in multiple layer sheet materials having four or more layers. In the preferred embodiments, having at least five layers, the first layer comprises a vinylidene chloride copolymer having a first softening temperature.

A second polymeric sealant layer has a second softening temperature no lower than about 20° C. less than the first softening temperature.

A third layer, between the first and second layers, has a third softening temperature greater than the first and second softening temperatures, and is comprised of polyethylene terephthalate.

A fourth polymeric layer has a fourth softening temperature greater than the first and second softening temperatures. The first layer is between the third and fourth layers.

A fifth impact layer is between the second and third layers. The composition of the impact layer has, as a first component, a base polymer drawn from the same family of polymers as a major polymeric componenet of the second sealent layer, and as a second component of the impact layer, a polymeric composition providing elastomeric properties to the impact layer and increased shock tolerance to the multiple layer sheet material. All the layers of the sheet material are adhered respectively to each other.

A "major component" of a layer comprises at least 40% of that layer by weight.

Functionally, heat seals are formed with the sheet materials of the invention by applying a combination of heat and pressure through the fourth layer to soften the second layer and form the heat seals. During that formation of heat seals, the first layer is also softened to the point that conventional amounts of pressure during the sealing tend to thin the first layer. The third layer is not softened to the point of thinning under those conditions.

In preferred embodiments of the invention the composition of the second layer comprises a polypropylene polymer as a major polymeric component, and especially a polypropylene copolymer. Also acceptable for the second layer are polymers, such as high density polyethylene, whose melting point temperatures are below the melting point temperature of both the third and fourth layers while being similar to, or above, that of the first layer.

Preferred compositions for the fourth layer are selected from among polyesters, polycarbonates, polyamides, and polypropylenes. A highly preferred material for the fourth layer is polyethylene terephthalate, which may be the same composition as used for the third layer.

In preferred embodiments of the invention, and wherein the composition of the second layer comprises a polypropylene polymer, and wherein the first component of the fifth layer thus comprises a polypropylene polymer, the second component of the fifth layer comprises polyisobutylene.

In other embodiments of the invention, the fifth layer includes, as a third component, an ethylene butene-1 copolymer containing 85% to 95% ethylene.

In some embodiments of the invention, the second component of the fifth layer may comprise the ethylene butene-1 copolymer containing 85% to 95% ethylene. In those embodiments where the second component in the fifth layer is the ethylene butene-1 copolymer, the fifth layer may also include a second polymeric composition providing elastomeric properties to the fifth (impact) layer and shock tolerance to the multiple layer sheet material, the ethylene butene-1 copolymer comprising the first polymeric composition providing elastomeric properties. Thus, sometimes a three component composition is used wherein the second and third components both contribute elastomeric properties to the impact layer, and wherein both contribute shock tolerance properties to the overall composite of the multiple layer sheet material.

With respect to the second heat sealable layer of the sheet material, polypropylene may, in some cases, tend to form heat seals which are so strong that they can not be readily opened for gaining access to the contents of the package. Thus, in certain embodiments of the invention, it is desirable that the composition of the second heat seal layer be modified in order to reduce the strength of the seal formed, such that the seal is peelable. To that end, the composition of the second sealant layer may comprise a combination of a propylene polymer and a polyethylene having a density of at least about 0.930, preferably at least about 0.940, most preferably at least about 0.950. Further with respect to the second sealant layer, it is seen that the preferred compositional materials, such as polypropylene and high density polyethylene, tend to be quite crystalline in their polymeric structure, and so have a tendency to be somewhat brittle. With respect to that brittleness, it is, in some embodiments of the invention, preferred to include as a component of the second layer up to about 20% of the material providing elastomeric properties to the sealant layer. Preferred materials for providing the elastomeric properties are either polyisobutylene, ethylene butene-1 copolymer containing 85% to 95% ethylene, or a combination of the polyisobutylene and the ethylene butene-1 copolymer. The material providing the elastomeric properties is preferably present in an amount of about 2% to 20% by weight of the overall composition of the second layer.

The sheet materials of the invention are adapted to readily be made into packages, or to be used in combination with other sheet materials in fabrication of packages.

DETAILED DESCRIPTION OF THE ILLUSTRATED EMBODIMENTS

The applicants herein have discovered that, in films where the softening temperature of the sealant layer is at least as great as 50° C. below the softening temperature of the vinylidene chloride copolymer, the amount of heat required to activate the sealant layer is sufficient to soften the vinylidene chloride copolymer: wherein the preferred embodiments of this invention find excellent application. Sealing layer compositions whose softening temperatures more closely approach that of the vinylidene chloride copolymer require even more heat to activate them. It should be comprehended that the sealing heat is conducted through the (susceptible) vinylidene chloride copolymer layer in order to reach the sealing layer. This creates a temperature gradient between the susceptible layer and the sealing layer. Also the susceptible layer experiences the heat for a longer period of time than the sealing layer, since it is physically closer to the heat source. Thus the higher temperature experienced over a longer period of time, by the susceptible layer, as compared to the sealing layer, means that the susceptible layer may be susceptible to softening even though its softening temperature is equal to or a little above the corresponding softening temperature of the sealing layer. The amount by which the softening temperature of the susceptible layer may be above that of the sealing layer, and still be susceptible to being softened, depends on the temperature of the seal bar applied at the outer layer of the film. If a relatively lower temperature is used on the seal bar, lower temperature is experienced by the susceptible layer, and a lesser degree of susceptibility exists. But a lower temperature requires longer sealing time. So in the interest of time economy, a higher temperature is often used. Indeed a temperature gradient of as much as 30°-40° C. may be used. The susceptible layer may experience, for example, about half of the above gradient, depending, of course, on details of the specific film structure. So films wherein the softening temperature of the susceptible layer is similar to that of the sealing layer, namely up to about 20° C. above the corresponding temperature for the sealant layer, or below that of the sealing layer, experience the above recited susceptibility.

Figure 1:
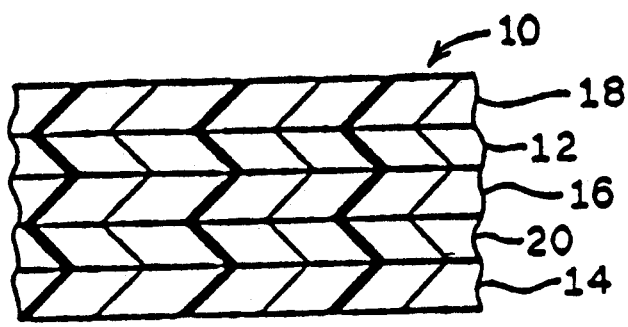
FIG. 1 is a cross-section of a five layer sheet material representative of the sheet materials of this invention.

Referring now to FIG. 1, the overall film of the invention is represented by the numeral 10. Layer 12 is a layer of vinylidene chloride copolymer. Vinylidene chloride copolymers suitable for use in layer 12 are prepared utilizing such comonomers as methyl, ethyl, isobutyl, butyl, octyl, and 2-ethylhexyl acrylates and methacrylates: phenyl methacrylate: cyclohexyl methacrylate, p-cyclohexylphenyl methacrylate, chloroethyl methacrylate, 2-nitro-2-methyl-propyl methacrylate, and the correspnding esters of acrylic acid: methyl alpha-chloroacrylate, octyl alpha-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, isopropenyl acetate, acrylamide, methacrylamide or monoalkyl substitution products thereof, phenyl vinyl ketone, diethyl fumarate, diethyl maleate, methylene diethyl malonate, dichlorovinylidene flouride, dimethyl itaconate, diethyl itaconate, dibutyl itaconate, vinyl pyridine, maleic anhydride, and allyl glycidyl ether. Preferred comonomers are methyl acrylate and vinyl chloride.

Layer 14 is a sealant layer having a softening temperature preferably no more than about 20° C., but sometimes up to 50° C., less than the softening temperature of the vinylidene chloride copolymer of layer 12. Layer 16 has a melting point temperature higher than the melting point temperatures of either layer 12 or layer 14. The composition of layer 16 does not soften enough to flow significantly at the process conditions under which the heat seals are formed, and comprises a polyethylene terephthalate.

The composition of layer 14, while it includes a high fraction of the higher softening temperature material such as polypropylene or high density polyethylene, may include modifiers, especially (1) those which affect the level of adhesion developed by the sealant layer 14 when the heat seal is formed, and (2) those modifiers which affect the flexural properties of layer 14 or its ability to tolerate impact/shock abuse.

Especially when the sealant layer 14 contains a major amount of polypropylene, it may contain a modifying material which reduces the strength of the heat seal fabricated using the sealant layer. A composition exemplary of those wherein the strength of the seal formed at seal layer 14 is less than the strength of a seal fabricated from 100% polypropylene polymer, is a blend of polypropylene polymer and an ethylene polymer modifier having a density of at least about 0.93, preferably at least about 0.94, most preferably at least about 0.95, and herein referred to as high density polyethylene (HDPE). While virtually any amount of the ethylene modifier in the composition will reduce the seal strength as compared to 100% polypropylene, it usually requires at least about 2% to 3% by weight of the polyethylene in the blend composition before a reduction in the seal strength is noticeable, so this is a preferred lower limit for the inclusion of polyethylene for the purpose of reducing the seal strength. As the amount of polyethylene in the blend composition is increased, the strength of seals formed using that composition generally decreases. Advantageously, the polyethylene content may be up to about 35%, and so that represents a preferred upper limit to the amount of polyethylene used in the blend composition. When greater than 40% polyethylene is used, the seal strength is sufficiently weak that the integrity of the package cannot be assured over its use life, and so use of over 35% polyethylene is not preferred.

By thus using the polyethylene modifier, the seal strength of the sheet material, when sealed in fabrication of a package seal, may be controlled so that the force required to peel the package open may be effectively controlled while providing an acceptably strong seal for protecting the contents on the interior of the package.

Exemplary of the modifiers which affect the flexural properties of sealant layer 14 are materials providing elastomeric properties, such as butylene polymers, i.e. polyisobutylene and ethylene butent-1 copolymer containing about 85-95 mole percent ethylene. These affective materials may, themselves, be referred to as elastomers. In those cases where such material is used, it is preferably included in an amount of at least about 2% by weight of the overall composition of layer 14, and up to about 40%. The lower limit of 2% is that amount which is generally required in order to obtain a measurable difference in the flexural properties or the shock/impact tolerance properties of the sheet material 10. Inclusion of up to about 20% of the elastomeric material is advantageous in that the flexural and shock/impact tolerance properties are accordingly increased. While greater than 20% of the material providing elastomeric properties may be used in layer 14 in certain special embodiments, as the amount of such material is increased, the amount of the main polymer, for example polypropylene and any seal strength modifier such as the HDPE, is reduced accordingly, such that the sealant properties and the heat tolerance properties accorded by those components are reduced. Generally, then, no more than about 20% of the composition of layer 14 is comprised of the elastomer modifier. Preferred materials for elastomer modification of layer 14 are, as indicated above, one of the polyisobutylene polymers or one of the ethylene butent-1 copolymers containing 85-95 mole percent ethylene. In some cases, it has been found advantageous to use the ethylene butene-1 copolymer and polyisobutylene in combination as the elastomeric modifier for layer 14. In some, less preferred, embodiments, it is satisfactory to use the polyisobutylene with another elastomer other than the ethylene butene-1 copolymer or to use the ethylene butene-1 copolymer with another elastomer other than polyisobutylene. Exemplary of these other elastomers which may serve as the second elastomeric component in layer 14 are styrene butadiene styrene copolymer (SBS), styrene ethylene butylene styrene copolymer (SEBS), styrene isoprene styrene copolymer (SIS), ethylene propylene rubber (EPR), polybutylene, ethylene propylene diene monomer terpolymer (EPDM), and the like. Certain of the materials providing elastomeric properties may also act to reduce seal strength, depending on the composition of the surface to which layer 14 is to be sealed. So the use of elastomer is coordinated with the use of any seal strength modifier such as HDPE.

Layer 18 generally forms the outer layer of the film as seen in FIG. 1. Layer 18 is that layer which is in contact with conventional heat sealing equipment when the heat seal is formed by forcing heat through the film to soften and fuse sealant layer 14 in formation of the heat seal. Thus the softening temperature of the composition of layer 18 must be greater than the softening temperature of the composition of layer 14. To the extent the softening temperature of layer 14 is greater, then the layer 18 composition would be softened during the formation of heat seals. As a result, the material of layer 18 would stick or otherwise deform while in contact with the equipment that provides the heat for the formation of heat seals. So long as the composition of layer 18 provides the function of being thermally stable, and does not become sticky, during the formation of the heat seals, its composition can be selected with relative freedom, and dependent on parameters other than its thermal stability. Exemplary of materials preferred for the layer 18 composition are polyesters, polycarbonates, polyamides, and polypropylenes. A highly preferred material for use in layer 18 is polyethylene terephthalate.

The films of the invention, as seen in FIG. 1, preferably provide an intervening layer 16 between the vinylidene chloride copolymer in layer 12 and the sealant layer 14. It is desirable that the softening temperature of the composition of layer 16 be great enough that the composition of layer 16 is not melted, or otherwise significantly softened such that it flows, at the conditions at which the heat seals are fabricated in the formation of a package. The heat sealing conditions vary somewhat with each commercial operation, and sometimes with each operator. These variances can readily be accommodated within the spirit and context of the invention.

Any of the polypropylenes may be used as the first component of the combination in the composition of layer 20. Polypropylenes which are copolymers having about 2 to about 5 mole percent ethylene are preferred, as the copolymer provides some minimum level of additional resilience as compared to a homopolymer. Nonetheless, the term "polypropylene" as used herein with respect to layer 20 is intended to incude homopolymers and copolymers except where specified otherwise, since the primary impact tolerance of the sheet material is not so much dependent on the polypropylene as it is on the elastomer-modifying component. Whether the polypropylene is a homopolymer or copolymer, its resilience is enhanced substantially by the incorporation of the elastomeric component. Without the incorporation of the elastomeric component, layer 20 is incapable of performing its intended function of providing flexural properties and improved impact/shock tolerance to the sheet material.

For example, a blend of 60% by weight of polypropylene and 40% polyisobutylene is superior to the same polypropylene in an unblended composition. Similarly, a blend of 65% by weight polypropylene and 35% by weight ethylene butene-1 copolymer containing 90% ethylene is superior to the same polypropylene in an unblended composition. While polyisobutylene and ethylene butene-1 copolymer are preferred as the material for providing elastomer properties in layer 20, others of the conventional elastomers may be used as well. Exemplary of these are ethylene propylene rubber (EPR), styrene butadiene styrene copolymer (SBS), styrene ethylene butylene styrene copolymer (SEBS), ethylene propylene diene monomer terpolymer (EPDM), styrene isoprene styrene copolymer (SIS), polybutylene, and the like.

While polpropylene is illustrated herein as the composition for the bass polymer of layer 20, the composition of the base polymer for layer 20 is dependent on the base polymer selected for the sealant layer 14. Thus where sealant layer 14 is, for example, a polyethylene, then the base polymer for layer 20 will also be a polyethylene, with the polyethylene being modified by an elastomer as taught herein. And while the use of a material other than polypropylene is acceptable, the discussion herein will emphasize the polypropylene, since polypropylene is the preferred material.

Figure 2:
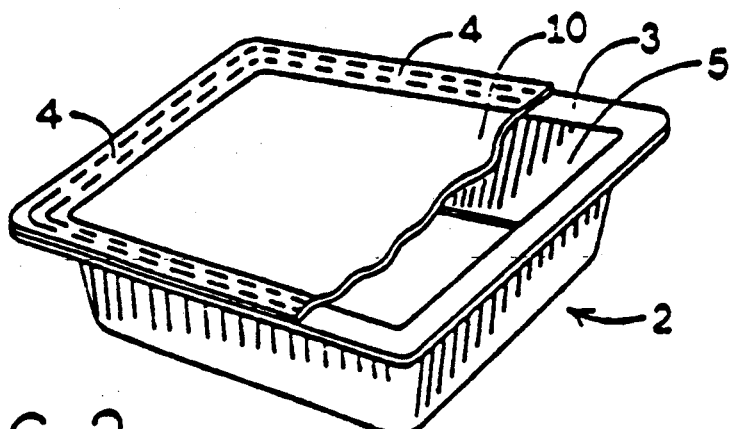
FIG. 2 is a pictorial view partially cut away of a tray package which is closed with a lid made with the sheet material of this invention.
Figure 3:
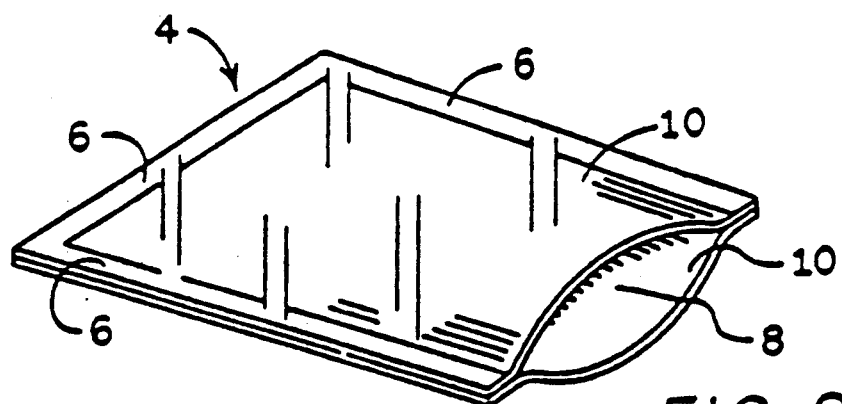
FIG. 3 shows a pictorial view of a pouch made with the sheet material of this invention.

Further improved performance of layer 20 in the sheet materials of this invention, and especially as respects impact tolerance of the sheet material when fabricated into a package as illustrated in FIGS. 2 and 3, is sometimes seen when the polypropylene is combined with two materials which provide elastomeric properties as disclosed herein. Generally the polypropylene is present in an amount of about 40% to about 70%, preferably about 50% to about 60% by weight. A lower level of about 40% is generally preferred in order to maintain at least a minimum level of the high temperature tolerance of the composition which is provided by the polypropylene. An upper level of about 70% is generally desired in that a minimum amoung of about 30% of the material providing the elastomeric properties is generally preferred in order to attain the impact tolerance desired of the sheet materials of the invention. In some cases, however, greater than 70% of the composition may be polypropylene, where the properties of the polypropylene enhance a particular need of the sheet material for the end use intended and/or where other layers assist in provision of impact/shock tolerance. It should be noted, however, that where the polypropylene is greater than 70% of the composition of layer 20, less of the shock tolerance and flex properties may be evident in the sheet material unless compensated by properties of other layers. In some cases the layer 20 composition may contain up to as high as 90% polypropylene, with only the remaining 10% of the composition of layer 20 comprising the elastomer-providing material. While the incorporation of virtually any amount of the second component (namely the elastomer-providing material) into the composition will provide some benefit, generally improvement in the impact tolerance and the flexural properties of the sheet material are first evident at a level of about 10% by weight elastomer. And while up to about 60% of the second elastomer-providing component may be used, the most desired balance of properties is generally achieved when the elastomeric components are present in an amount of about 30% to about 60% by weight.

Where the third component, which is the second elastomeric component, is used in layer 20, the third component is generally present in an amount which represents a ratio of about 1/6 to about 2/3 of the second component. While it is entirely possible that the elastomeric components be present in up to equal amounts, generally the greatest improvement in the impact/shock tolerance and flexural properties are seen where one component is present in a greater amount than the other.

While the use of only one elastomer modifier in layer 20 does provide a significant level of improvement in the impact tolerance of the sheet material and its flexural properties, and its simplicity is advantageous, further improvements are generally observed when the impact layer includes two elastomer modifiers. The composition of layer 20 thus preferably includes at least three components; the base polymer (generally polypropylene), the first elastomer modifier, preferably polyisobutylene or the above ethylene butent-1 copolymer, and the second elastomer modifier. The relationship among the three components is a mystery, in that the use of the second and third components as defined herein may provide a blend having superior properties as compared to a blend comprised of only two components, but having the same total amount of elastomer modifier. While this is not always the case, it has been found true in many embodiments. Thus, the most preferred family of compositions of layer 20 is that which includes three components, within the ranges specified.

Reference is again made to the composition of layer 14, and especially to that composition where the polymer providing the preponderance of properties, especially with respect to heat tolerance and seal strength, is polypropylene. In addressing the technical issues surrounding the composition of sealant layer 14, it is seen that heat tolerance and heat stability are critical to the functioning of the sheet material in the contemplated high temperature environment. For those applications requiring these parameters, propylene polymers are seen to be excellent for tolerating the severe processing conditions. Also, the sealability of propylene polymers to, for example, formed trays having a propylene based surface, is excellent. To the extent propylene homopolymer or propylene copolymer is used by itself as the sealant layer 14 for sheet material 10, and where the sealing surface of flange 3 contains polypropylene, the adhesion between sealant layer 14 and flange 3 of the tray as seen in FIG. 2, and the cohesive strength of layer 14, may be so strong that the ability to open the package may be impeded.

In general, as increasing amounts of propylene are used in the composition of layer 14, the force required to peel open the respective package becomes commensurately greater. To the extent that the sheet material 10 has excellent interlayer adhesion and appropriate layer cohesive strengths, these greater peel strengths are acceptable, and thus up to about 90% propylene polymer may be used. To the extent the interlayer adhesion within sheet material 10 is of a lesser degree, using high amounts of propylene (for example over 80% of a copolymer having 95% or more propylene) can result in delamination within the sheet material 10 when an attempt is made to peel sheet material 10 from the closed and sealed package. Thus where interlayer adhesions are more moderate, it is desirable to use less propylene polymer in the blend, and respectively more ethylene. Preferred compositions range between about 65% and about 75% by weight propylene and between about 35% and about 25% HDPE. As the fraction of propylene polymer decreases below about 65%, the seal strength between layer 14 and flange 3 is reduced to the point where shock/impact tolerance of the sealed package is reduced such that the package may be opened at the seal during impact testing.

The adhesion between the layers in sheet material 10 is affected by the tendency of the sheet material to elongate under elongation stresses. It can also be affected by compression of one or more of the layers during the heat sealing process. To the extent the sheet material can be elongated, the elongation puts stresses on the interfaces between the several layers, as each of the differing individual layers responds to the stresses somewhat differently and according to the properties of its own composition. This tends to stress the interfacial adhesion and thus to weaken adhesion at those respective interfaces. Layer compression has a similar effect, in applying lateral and longitudinal stresses to layer interfaces.

Thus those sheet structures 10 which can be elongated, or undergo significant compression during heat sealing, generally work best when they are combined with a sealing layer 14 which comprises a blend of propylene and ethylene polymers in the lower end of the range of propylene, wherein the lid can be peeled, for example, off the tray, with more modest forces. On the other hand, since higher fractions of propylene do yield packages having stronger seals and stronger cohesion in layer 14, higher fractions of propylene are preferred where their use can be tolerated. Thus the amount of propylene in the blend of layer 14 is generally in the higher end of the range for those sheet materials which have, for example, less extensibility, such as provided by a stabilizing layer such as paper.

The character and amount of HDPE used, if any, in the composition of layer 14 is preferably selected with reference to the nature of the propylene polymer which is contemplated for use in the composition, and the adhesive and cohesive strengths in and between the several layers in the sheet material. A relatively larger amount of HDPE is used in the blend where the propylene content of the propylene polymer is in the upper portion of its range. To the extent the amount of propylene in the propylene polymer is reduced, lesser amounts of HDPE are used in the composition. In most cases the propylene polymer is a copolymer having at least a small amount of ethylene, i.e. 2%, in its composition.

To the extent the propylene polymer is a homopolymer or copolymer containing up to about 5% ethylene, the larger fractions of HDPE are preferred in the blend composition, up to about 40% HDPE. To the extent the propylene polymer contains more ethylene, such as containing 20% ethylene and 80% propylene, the smaller fractions of HDPE are preferred in the blend composition, such as 10% to 20% HDPE.

The high density polyethylene can have a density as low as 0.93 and still provide some control of the seal strength of layer 14. However, higher density polyethylenes generally are more effective. So a density of at least about 0.94 is preferred, with densities of at least about 0.95 being most preferred.

With respect to the composition of layer 14 comprising the base polymer of, for example, polypropylene and a modifying material, such as high density polyethylene, for controlling the strength of the seal formed by layer 14, and the associated peeling properties, for opening a package, the percentages used so far herein address only those two components. To the extent a third component, such as, for example, a elastomer-providing component is incorporated into layer 14, the fractional compositions recited for the base polymer and the modifying polymer are not altered according to the incorporation of the elastomer. Rather the fraction of the elastomer is considered with respect to the overall composition of layer 14. To that end, the composition of, for example, 65% propylene polymer and 35% HDPE may be blended, in a preferred embodiment, with an elastomeric material such as a polyisobutylene, or an ethylene butene-1 copolymer as earlier recited. A preferred blend for the composition of layer 14 comprises, for example, 20% of an elastomer component and 80% of the composition of the base polymer and the seal strength modifying polymer, wherein the base polymer is about 65% and the modifying polymer about 35% of that subcombination of 80%.

FIG. 2 illustrates generally, the functioning of the sheet material of the invention as a lid on a tray 2. In sealing of the sheet material 10 to the tray 2, layer 14 is joined to flange 3, and thus comprises the sealant layer as previously discussed. As the sheet material 10 is peeled from the tray flange in opening the tray, a splitting may occur in sealant layer 14 where the sealant layer is sealed to the flange 3 as at 4 in FIG. 2, to thus provide access to the interior 5 of the container. The peeling of the sheet material 10 away from flange 3 is usually accompanied by this splitting in layer 14 which comprises a cohesive failure of layer 14 in the area of the seal at flange 3. In some cases, however, the sealant layer 14 peels cleanly away from the sealed area 4 at flange 3 without leaving any significant portion of layer 14 on the flange. Typically, though, the removal of sheet material 10 from the package by way of peeling it from flange 3 results in a separation of layer 14 in the seal area such that a portion of layer 14 remains on the flange at seal area 4 and a second portion is removed with the sheet material 10.

In order to provide adequate adhesion between the respective pairs of layers 12, 16, 18, and 20, adhesives are provided at the respective interfaces. The adhesives for use at the respective interfaces can readily be determined according to ordinary adhesive selection in the polymer industry. Exemplary of adhesives which are acceptable are the aliphatic urethane curing-type adhesives available from Morton Chemical Company under the tradename Adcote, for example Adcote 76T198. Other suitable adhesives will be known to those skilled in the art.

While it is important to the invention that layer 20 be interposed between the sealant layer 14 and layer 16 which forms a portion of the substrate of the sheet material, the invention is entirely functional if additional layers of material are used between layers 14 and 16, so long as the advantageous properties of immpact tolerance and flexural properties provided by layer 20 are maintained, along with appropriate inter-layer adhesions. Additional layers may likewise be used elsewhere in the sheet material. In some cases, the five layer sheet material illustrated in FIG. 1 may thus be a substructure of a more complex multiple layer sheet structure.

Figure 4:
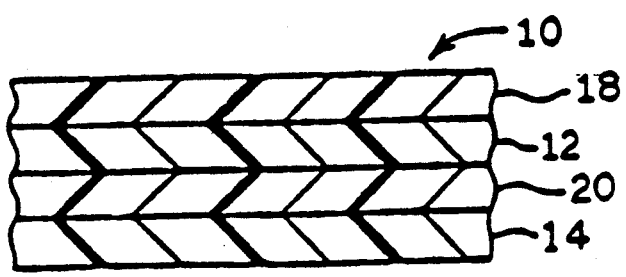
FIG. 4 shows a cross-section of a four layer sheet material of this invention.

In some less preferred embodiments, and referring to the structure illustrated in FIG. 1, layer 16, which is the interior layer of PET, may be omitted. The resulting 4-layer structure, as seen in FIG. 4, has the impact layer 20 bonded to the vinylidene chloride layer 12. Suitable adhesive is a curing urethane adhesive such as Morton Adcote 76T198.

EXAMPLE 1

A five layer sheet material was made as follows. Polyethylene terephthalate films, 0.012 mm thick were adhesively laminated to both sides of a film of vinylidene chloride vinyl chloride copolymer which was 0.05 millimeter thick. The vinylidene chloride copolymer film was obtained from Dow Chemical Company as HB-200. The polyethylene terephthalate was Mylar from DuPont. An impact/sealant substructure was fabricated for layers 14 and 20 by coextruding those two layers in an air cooled blown tubular coextrusion process. The composition of layer 14 was 70% by weight of a polypropylene polymer, containing about 2.7% ethylene as a block copolymer, namely HIMONT SA-752, from Himont Company, and 30% by weight of an HDPE having a density of 0.958. The composition of layer 20 was about 56% polypropylene, about 33% polyisobutylene, and about 11% of an ethylene butene-1 copolymer containing 90 mole percent ethylene. Layer 14 was approximately 0.025 millimeter thick. Layer 20 was approximately 0.08 mm. thick. Layers 16 and 18 were each approximately 0.012 millimeter thick, and were adhesively laminated to layer 12 using Adcote 76T198. The resulting sheet material was thus about 0.18 millimeter thick.

EXAMPLE 2

A sheet material was made as in EXAMPLE 1 except that the sealant layer 14 was about 0.019 millimeters thick and the impact layer 20 was about 0.057 millimeters thick. In addition, a titanium dioxide color concentrate in a polypropylene base polymer was used in impact layer 20, with the concentrate being approximately 6% of the weight of the layer 20 composition. Overall thickness of the sheet material was about 0.15 mm.

COMPARATIVE EXAMPLE 1

A sheet material was made as in EXAMPLE 2 except that 0.057 mm. of polypropylene copolymer containing 2.7% ethylene was used in place of the impact layer. The overall sheet material thickness was about 0.15 mm.

EXAMPLE 3

A sheet material was made as in EXAMPLE 2 except that the impact layer 20 0.05 millimeter thick and the sealant layer was 0.025 millimeter thick and was a blend of 60% polypropylene and 40% of the HDPE.

EXAMPLE 4

A sheet material was made as in EXAMPLE 3 except that the composition of the sealant layer was 65% polypropylene and 35% HDPE.

EXAMPLE 5

A sheet material was made as in EXAMPLE 4 except that the composition of the sealant layer was about 63% polypropylene, about 30% HDPE and about 7% polyisobutylene.

EXAMPLE 6

A sheet material was made as in EXAMPLE 3 except that the composition of the sealant layer was about 65% polypropylene, about 30% HDPE and about 5% polyisobutylene.

EXAMPLE 7

A sheet material was made as in EXAMPLE 2 except that the composition of the impact layer was the same as the impact layer used in EXAMPLE 1.

EXAMPLE 8

A sheet material was made as in EXAMPLE 1 except that the impact layer was 0.05 mm. thick. The overall thickness of the sheet material was about 0.15 mm.

EXAMPLE 9

A sheet material was made as in EXAMPLE 8 except that the interior layer of PET was omitted. The overall thickness of the sheet material was about 0.14 mm.

COMPARATIVE EXAMPLE 2

A sheet material was made as in EXAMPLE 9 except that 0.05 mm. of polypropylene copolymer was used in place of the 0.05 mm. impact layer of EXAMPLE 9.

All the sheet materials of the above EXAMPLES had improved impact resistance as compared to Comparative Example 2 which forms no part of this invention, and had good flex properties. Comparative Example 1 is the subject of copending application Ser. No. 081,789. The sheet materials of EXAMPLES 8 and 9 were used to fabricate lids for preformed trays as seen in FIG. 2, wherein the trays had a sealing surface comprising polypropylene. Closed and sealed packages were formed by fabricating heat seals wherein the sheet material of the lid was sealed to the flanges of the trays as illustrated at 4 in FIG. 2. The tray flanges 3, to which the subject lid material was sealed, were about 1.3 mm. thick, with a sealing surface layer about 0.25 mm. thick and having a composition comprising a blend of 60% polypropylene and 40% high density polyethylene. At the outer periphery, the trays were about 159 mm. long by about 114 mm. wide.

Before formation of the heat seals, to close the package, as seen in FIG. 2, 340 milliliters of water were place in the trays as content. Finally the lids were applied, and sealed to the trays to form the closed and sealed packages. The closed and sealed packages were retort processed at 121° C. with about 1.75 Kg/cm$^2$ of pressure for 30 minutes of cook time followed by 20 minutes of cooling. Come-up time was 15 minutes.

The thus process sealed packages were subjected to the standard USDA Immediate Container Abuse Test, without overwrap, using a standard drop chute apparatus. This test is intended to simulate dropping of individual packages on a controlled, reproducible basis.

The chute is inclined at an angle of 15° from the vertical and has a rigid base plate at a 90° angle to the chute, also the direction of fall. The chute itself has guide rods or iron corner guides, continuous from the top release point of contact to the base. The chute is fitted with a package release mechanism.

Each package was dropped twice, first on its longer side, and then on its shorter end. The packages impacted the rigid base with an impact of about 35 cm. kg.

Packages representing EXAMPLES 8 and 9, and Comparative Examples 1 and 2 were drop tested in the manner described above. It is seen from Table 1 following that all the packages of Comparative Example 2, which contained neither an impact layer nor an interior PET layer, failed the drop tests. When an impact layer was included (EXAMPLE 9) 23% of the packages survived the testing. When a PET layer was included, but not an impact layer (Comparative Example 1), 60% of the packages survived the testing. But when both an impact layer and the interior PET layer (EXAMPLE 8) were included, 94% of the packages survived the drop testing.

Failures in the drop testing typically occurred by splitting of the lid at the inner sealant junction.

TABLE 1

|  | Number Tested | Number Survived Test | Percent Survived Test |
|---|---|---|---|
| Ex. 8 | 36 | 34 | 94% |
| Ex. 9 | 53 | 12 | 23% |
| Comp. Ex. 1 | 48 | 29 | 60% |
| Comp. Ex. 2 | 35 | 0 | 0 |

Clearly, the sheet materials result in closed packages having greater impact tolerance than similar sheet materials but wherein the impact layer 20 and interior PET layer 16 are omitted. And the incorporation of both the impact layer and the interior PET layer results in a dramatic improvement in the impact tolerance for these preferred embodiments. The improvements seen in adding only the interior PET layer are disclosed in copending application Ser. No. 081,789.

As used herein, increased shock tolerance or impact tolerance is measured with respect to the same sheet material but without the asserted responsible component material.

The sheet materials of this invention are highly desirable for use as closure members on packages generally fabricated from other sheet structures such as that seen in FIG. 2, wherein the films 10 of the invention are used to provide lids on an otherwise formed receptacle 2. Thus are the sheet materials of the invention highly adapted and highly satisfactory for use as lid stock in preformed trays as seen in FIG. 2.

The sheet materials of the invention are also highly satisfactory for use in fabrication of pouches, wherein the films of the invention comprise essentially all of the wall area of the package structure as seen in FIG. 3. The FIG. 3 illustration, of course, shows the package opened on one end for the insertion of product after which a corresponding heat seal 4 is used to close that open end to complete closure of the package.

For the five layer sheet materials of the invention as illustrated in FIG. 1, the overall sheet material thickness is typically of the order 0.05–0.30 mm., preferably 0.10–0.18 mm. thick. Four layer sheet materials are generally about 0.01 mm. thinner; in that the deleted layer 16 is generally about 0.01 mm. thick.

The temperature of seal equipment applied to the outer layer of the sheet material varies, depending on, among other things, the compositions of especially the outer layer as at 18 which contacts the seal equipment, and the seal layer as at 14 which forms the seal. Conventional amounts of seal pressure usually are in the range of 2.8 Kg/cm$^2$ to 6.3 Kg/cm$^2$, and commonly 2.8 Kg/cm$^2$ to 4.2 Kg/cm$^2$. Typical dwell time is 0.25 to 2.0 seconds, more commonly 1–1.5 seconds.

Thus it is seen that the invention provides an improved multiple layer polymeric sheet material having an interior (susceptible) layer of vinylidene chloride copolymer in combination with a sealant layer, and an impact layer between the sealant layer and the susceptible layer, and wherein the sealant layer composition has a softening temperature similar to or higher than the softening temperature of the susceptible layer. The improved multiple layer sheet materials have increased impact tolerance as compared to those sheet materials which do not include the impact layer which contains a base material and the modifying elastomer. The improved multiple layer sheet materials provide increased impact tolerance in a package while maintaining the ability in the sheet materials to form strong heat seals.

Those skilled in the art will now see that certain modifications can be made to both the compositions of the layers and to the layer structuring without departing from the spirit of the invention. And while the invention has been described above with respect to its preferred embodiments, it will be understood that the invention is capable of numerous rearrangements, modifications, and alterations and all such arrangements, modifications, and alterations are intended to be within the scope of the appended claims.

Having thus described the invention, what is claimed is:

1. A multiple layer sheet material, comprising:
   (a) a first layer of vinylidene chloride copolymer:
   (b) a second sealant layer comprising at least 40% by weight polypropylene;
   (c) a third impact layer between said first and second layers, the composition of said impact layer comprising (i) as a first component, a polypropylene polymer, and (ii) as a second component, a polymeric composition providing elastomeric properties to said impact layer and increased shock tolerance to said multiple layer sheet material; and
   (d) a fourth layer of polyethylene terephthalate, said first layer being between said third and fourth layers.

2. A multiple layer sheet materials as in claim 1 wherein said second component of said third layer is selected from the group consisting of polyisobutylene and ethylene butene-1 copolymers containing 85% to 95% ethylene.

3. A multiple layer sheet material as in claim 1 or 2 wherein said second layer comprises a mixture of polypropylene and a polyethylene having a density of at least about 0.93.

4. A multiple layer sheet material as in claim 1 or 2 and including, as a third component of said third impact layer, a second polymeric composition providing elastomeric properties to said third impact layer and shock tolerance to said multiple layer sheet material.

5. A package made with a sheet material of claim 1 or 2.

6. A package made with a sheet material of claim 3.

7. A package made with a sheet material of claim 4.

* * * * *